United States Patent
Dixon et al.

(10) Patent No.: US 8,459,241 B2
(45) Date of Patent: Jun. 11, 2013

(54) LIQUEFIED NATURAL GAS SYSTEM FOR A NATURAL GAS VEHICLE

(75) Inventors: David Dixon, Kimball, MN (US); Mark Oldham, Evanston, WY (US); Kenny Oldham, Coalville, UT (US)

(73) Assignee: Northstar, Inc., Evanston, WY (US)

( * ) Notice: Subject to any disclaimer, the term of this patent is extended or adjusted under 35 U.S.C. 154(b) by 793 days.

(21) Appl. No.: 12/640,442

(22) Filed: Dec. 17, 2009

(65) Prior Publication Data

US 2011/0146605 A1    Jun. 23, 2011

(51) Int. Cl.
*F02M 21/02* (2006.01)

(52) U.S. Cl.
USPC .......... 123/525; 123/527; 123/27 GE; 62/50.2

(58) Field of Classification Search
USPC ............... 123/525, 527, 27 GE, 1 A; 62/48.1, 62/50.2, 50.4, 50.7, 53.2
See application file for complete search history.

(56) References Cited

U.S. PATENT DOCUMENTS

| | | | |
|---|---|---|---|
| 5,081,977 A * | 1/1992 | Swenson | 123/527 |
| 5,121,609 A * | 6/1992 | Cieslukowski | 62/50.4 |
| 5,127,230 A | 7/1992 | Neeser et al. | |
| 5,163,409 A * | 11/1992 | Gustafson et al. | 123/525 |
| 5,228,295 A * | 7/1993 | Gustafson | 62/7 |
| 5,325,894 A | 7/1994 | Kooy et al. | |
| 5,373,700 A * | 12/1994 | McIntosh | 62/48.1 |
| 5,373,702 A | 12/1994 | Kalet et al. | |
| 5,390,646 A * | 2/1995 | Swenson | 123/525 |
| 5,921,090 A * | 7/1999 | Jurewicz et al. | 62/50.2 |
| 6,044,647 A | 4/2000 | Drube et al. | |
| 6,125,637 A * | 10/2000 | Bingham et al. | 62/7 |
| 6,494,191 B2 * | 12/2002 | Bingham et al. | 123/527 |
| 6,619,273 B2 * | 9/2003 | Bingham et al. | 123/527 |
| 6,953,028 B2 * | 10/2005 | Bingham et al. | 123/527 |
| 7,044,113 B2 * | 5/2006 | Bingham et al. | 123/523 |
| 7,360,368 B2 * | 4/2008 | Fickel et al. | 62/50.2 |

FOREIGN PATENT DOCUMENTS

| | | |
|---|---|---|
| GB | 1325349 | 8/1973 |
| JP | 6 123569 | 5/1994 |
| JP | 8 159394 | 6/1996 |
| WO | WO 2009/126604 | 10/2009 |

* cited by examiner

*Primary Examiner* — Noah Kamen
*Assistant Examiner* — Hung Q Nguyen
(74) *Attorney, Agent, or Firm* — Thorpe North & Western LLP (57) ABSTRACT

A liquefied natural gas system for a natural gas vehicle engine with flow driven by the engine includes dual flow paths through at least one heat exchanger. A return path extends from the dual flow paths to the storage tank, and an engine feed path extends from the dual flow paths configured to couple to the engine. A valve and control system are coupled to the dual flow paths capable of alternating flow through the dual flow paths so that one flow path supplies the engine through the engine feed path while the other flow path pressurizes the storage tank through the return path.

20 Claims, 8 Drawing Sheets

LIQUEFIED NATURAL GAS SYSTEM FOR A NATURAL GAS VEHICLE

BACKGROUND

1. Field of the Invention

The present invention relates generally to a liquefied natural gas (LNG) system for a natural gas vehicle engine. More particularly, the present invention relates to a liquefied natural gas system for increasing the pressure in a cryogenic fluid storage tank.

2. Related Art

Cryogenic liquids, such as liquefied natural gas (LNG), nitrogen, oxygen, carbon dioxide, hydrogen, and the like, are substances that normally exist as gases under normal atmospheric conditions, but are liquids at very low temperatures. Special vessels and systems are used to store and transfer cryogenic liquids because of the difficulty in maintaining the extremely cold temperatures. Such vessels typically include a double walled vessel having insulation and vacuum in the annular space. While the vacuum provides an effective insulation, the insulation is not perfect and heat penetrates the vessel walls. When heat is added to the cryogenic liquid, a portion of the liquid returns to the gaseous state, and the temperature and pressure of the contents of the tank are raised. The increased amount of gas within the vessel increases the internal pressure.

Conversely, when either liquid or vapor is withdrawn from the tank, the decreased volume of liquid and vapor in the tank causes the pressure to reduce. As pressure is reduced below the boiling point of the liquid, a portion of the liquid boils off. The boiling of the liquid reduces the temperature of the liquid, which in turns reduces the boiling point of the liquid. The result is that the liquid and vapor in the tank reach a new equilibrium state at a lower temperature and pressure. As liquid and vapor continues be withdrawn, the boiling of small amounts of liquid causes the saturation pressure and temperature to be lowered. The saturation pressure is the pressure at which the liquid is at its boiling point at a given temperature.

In common practice today, there are two methods for transferring the LNG fuel from the vehicle tank to the engine of the natural gas powered vehicle. The first is to use a pump to physically pressurize the LNG and move it to the engine. The second method is to use the pressure of the LNG in the vehicle fuel tank to move the fuel to the engine.

The problem with the systems that utilize tank pressure to move the fuel to the engine is that most engines require a minimum pressure of the fuel in order to be able to generate full rated power. If the fuel is at too low a pressure, or if the pressure in the tank is reduced due to fuel being removed, then it is possible that the engine power will be reduced or the vehicle will become inoperable.

A method for building pressure in typical cryogenic tanks is to circulate the cryogenic liquid into a heat exchanger, where the liquid is vaporized, raising the pressure in the tank. This typical pressure building system uses the liquid head caused by the depth of the fluid to generate flow through the circuit. The problem in cryogenic tanks, especially small horizontal cryogenic tanks used as vehicle tanks, is that there is only a very small liquid depth available in the tank to generate liquid head to drive a pressure building circuit. Pressure drop in the heat exchanger and piping components is large enough that the liquid head in the tank cannot overcome the resistance to flow, resulting in no flow through the pressure building circuit, and therefore no resulting pressure increase in the tank. Because of this there is a need for a different method for driving liquid through a pressure building system.

SUMMARY OF THE INVENTION

It has been recognized that it would be advantageous to develop a liquefied natural gas (LNG) system or pressure building system to build pressure in an LNG tank utilizing demand from the engine to drive flow, and without relying on pumps or gravity to drive the system.

The invention provides a liquefied natural gas pressure building system for a natural gas vehicle engine. The system includes at least one insulated storage tank capable of receiving liquefied natural gas. At least one heat exchanger is operatively coupled to the at least one storage tank. A piping system is coupled to the storage tank and the heat exchanger, and includes dual flow paths through the at least one heat exchanger, a return path from the dual flow paths downstream of the heat exchanger to the storage tank, and an engine feed path from the dual flow paths configured to couple to the engine. A valve and control system is coupled to the dual flow paths capable of alternating flow through the dual flow paths so that one flow path supplies the engine through the engine feed path while the other flow path pressurizes the storage tank through the return path.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1A:
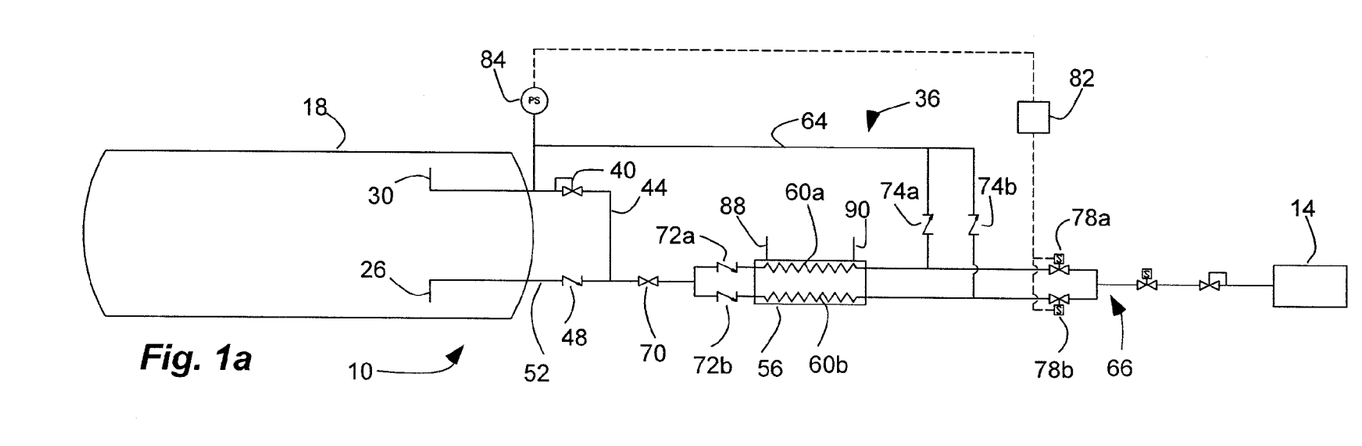
FIG. 1a is a schematic view of a liquefied natural gas (LNG) system for a natural gas vehicle engine in accordance with an embodiment of the present invention.

As illustrated in FIG. 1a, a liquefied natural gas (LNG) system, indicated generally at 10, is shown for a natural gas vehicle with a natural gas engine, indicated generally at 14, in an example implementation in accordance with the invention. The LNG system is a pressure building system to maintain the pressure in a vehicle fuel tank 18 at a minimum acceptable pressure so that the engine will be able to develop its full rated power. The LNG system or pressure building system described herein utilizes flow of LNG driven by demand from the engine, as opposed to systems which use a pump to move the fuel to the engine or which rely on liquid head generated by depth of liquid in the tank. The system alternates flow through dual flow paths through a heat exchanger to supply the engine, while the other path vaporizes and returns to the storage tank to pressurize the tank. The engine draws LNG from the storage tank through the dual flow paths into the heat exchanger where the LNG is vaporized and flows to the engine. When pressure in the tank is low, flow through one of the paths is stopped or blocked, trapping the LNG in the heat exchanger between an upstream check valve and a downstream control valve. A return path to the tank is provided through which the vaporized and pressurized LNG returns to the tank.

A system flow diagram in FIG. 1a shows the overall mechanical interaction and operation of a presently preferred embodiment of the present invention when installed on an LNG vehicle of a type currently in use. It will be appreciated that the system shown is installed on a vehicle. The system flow diagram also illustrates the flow paths for both liquid and vapor phase of the LNG system, as well as engine coolant flow. It will be appreciated that alternate designs and types of LNG vehicle storage tanks can be utilized without materially affecting the operation of the invention described herein. FIG. 1a also depicts typical flow control devices. These devices can also be altered without affecting the operation of this invention. The configuration shown in FIG. 1a can be utilized as a retrofit to existing LNG vehicles, such as trucks and buses. The vehicle can have at least one insulated storage tank 18 capable of receiving liquefied natural gas from a liquefied natural gas refueling station, and capable of containing the liquefied natural gas as a cold vapor, a liquefied gas, or both. Typically, the tank 10 can be a vacuum insulated cryogenic storage tank designed to contain liquefied natural gas. The tank 10 can be provided with an internal liquid withdrawal tube 26 and an internal vapor withdrawal tube 30. For clarity, other devices that are commonly installed on LNG vehicle tanks, such as pressure safety valves, liquid fill circuit, liquid level gauge, and pressure gauge, are not displayed in FIG. 1 since they are immaterial to the operation of the invention. In typical operating conditions, the liquid and vapor in the storage tank are saturated at a given pressure, meaning that the liquid in the tank has been warmed to a desired temperature and pressure equilibrium condition before being dispensed into the storage tank. For example, methane gas becomes liquefied at a temperature of approximately −220 degrees F. when under a pressure of approximately 65 psi.

A piping system 36 is coupled to the storage tank 18 and the engine 14, or to at least a piping system configured to be coupled to an engine. The piping system can include a vapor regulator 40 on a vapor circuit 44 that allows vapor flow at high tank pressure; and a check valve 48 that induces pressure drop in a liquid line 52 and helps vapor flow when the vapor regulator is open.

The LNG system or vehicle also includes at least one heat exchanger 56 operatively coupled to the storage tank 18 by the piping system 36. The piping system 36 includes dual flow paths 60a and 60b through the heat exchanger 56, a return path 64 from the dual flow paths downstream of the heat exchanger to the storage tank, and an engine feed path 66 from the dual flow paths to the engine, or to be coupled to the engine. The dual flow paths 60a and 60b can extend through a common heat exchanger, as shown, or can extend through separate heat exchangers, as discussed below. The dual flow paths 60a and 60b provide dual flow paths for LNG through one or more heat exchangers so that one or both flow paths can supply LNG to the engine, while one path can be selectively blocked downstream of the heat exchanger to vaporize the LNG for return through the return path 64 to the tank to pressurize the tank. The dual flow paths can form a pair of parallel paths, or substantially parallel paths, through the heat exchanger. The term "parallel" is used herein to denote that the dual paths are configured in parallel flow relationship, or schematically parallel, i.e. both flow paths extend through the heat exchanger to the engine, not that the pipes must be in a physically parallel relationship to one another.

The liquid circuit 52 and vapor circuit 44 combine at a junction and proceed through a manual shut off valve 70. The piping then splits at a manifold into the dual flow paths, including primary and secondary flow paths 60a and 60b, in a parallel, or substantially parallel, configuration through the heat exchanger 56. A pair of upstream check valves 72a and 72b can be disposed in the pair of parallel paths 60a and 60b upstream of the heat exchanger. Downstream of the heat exchanger 56, the parallel flow paths can be combined together and can couple to the engine feed path 66. The return path 64 can be coupled to one or both of the parallel flow paths 60a and 60b downstream of the heat exchanger 56. A pair of downstream check valves 74a and 74b can be disposed in the return path 64. One or more control valves 78a and 78b are coupled to the parallel flow paths 60a and 60b. The control valves 78a and 78b can be electronic valves, such as solenoid valves, or the like. A controller 82 or control electronics can be coupled to the control valves 78a and 78b, such as electrically, to operate the control valves. The controller and control valves can form a control system. A pressure sensor 84 or switch is coupled to the piping system 36 or storage tank 18, and coupled to the controller 82. For example, the pressure sensor 84 can be coupled to the return path 64.

When demand is made for fuel by the vehicle engine 14, the pressure in the piping between the engine and the storage tank is reduced, drawing fuel from the storage tank towards the engine. The pressure control devices on the storage tank can be arranged so that liquid is preferentially drawn from the storage tank at low tank pressures and vapor is also drawn from the tank at high tank pressures. Liquid flows from the internal withdrawal tube 26 into the external liquid tubing 52 and into the liquid check valve 48. The main purpose of check valve 48 is to induce a small amount of pressure drop in the liquid tubing in order to promote flow through the vapor regulator 40.

Downstream of the manual shut off valve 70, the flow enters the manifold and splits into the dual flow paths 60a and 60b, and through the pair of upstream check valves 72a and 72b. The check valves prevent liquid and vapor from flowing backward through the piping once it enters the heat exchanger 56. Flow only occurs in the flow path in which the control valve 78a and 78b is open. The flow enters the heat exchanger 56 and continues through heat exchanger tubes. The internal space inside the heat exchanger 56, and external to the heat exchanger tubes, is filled with a hot heat transfer media, such as hot water/glycol from the engine cooling system. The hot water/glycol solution enters the heat exchanger through piping connection 88 and exits through piping connection 90. The hot water/glycol solution causes the cold liquid and vapor entering the heat exchanger 56 to vaporize and become warm before it exits the heat exchanger. Thus, the heat exchanger can be heated by engine coolant. A second flow path can be added to the normally installed heat exchanger, or a dedicated heat exchanger can be provided. Additionally, an electric heat exchanger could also be used. The present embodiment utilizes a single heat exchanger with dual flow paths.

The pressure sensor 84 or switch senses pressure in the storage tank 18, and it and/or the controller 82 detects when the pressure in the storage tank falls below a predetermined set point. There are several ways in which the control valve can be actuated. A mechanical pressure switch or a pressure transmitter can be used to detect a low pressure condition in the tank. Then a programmable logic controller, mechanical relays, or solid state relays can be used to open and close the control valve. The control valve can either be electrical actuated or pneumatically actuated.

It will be appreciated that one of the control valves, such as 78a, will be open and liquid will flow through the heat exchanger 56 through one of the dual paths, such as primary flow path 60a, to supply the engine with fuel. It will also be appreciated that both control valves can be open and liquid can flow through the heat exchanger through both paths. When the pressure in the storage tank 18 is below the desired operating pressure, as measured by the pressure sensor 84, the system builds pressure in the storage tank. The controller 82 causes a control valve, such as 78b on a secondary flow path 60b, to open. Demand from the engine causes fuel to flow through this secondary flow 60b path to the engine. After a short period of time, the LNG will have filled the initial length of the secondary flow path 60b. Then, the controller closes one of the control valves, such as 78b, trapping the LNG within the heat exchanger in the secondary flow path 60b between the control valve 60b and the upstream check valve 72b. As the trapped liquid boils off, its pressure is raised, and then flows back into the tank through the downstream check valve 74b in the return path 64 and into the vapor space of the tank. The pressure can be built by alternately opening and closing the control valves 78a and 78b in opposition to each other. When, for example, control valve 78a is open and control valve 78b is closed, fuel demand from the engine causes liquid and vapor flow through the heat exchanger through the primary flow path 60a and on to the engine. After a set period of time, as controlled by the control system, the positions of control valves 78a and 78b are reversed. The fuel flow to the engine is now supplied by secondary flow path 60b through the control valve 78b. Meanwhile, the liquid that remains in the primary flow path 60a continues to be vaporized. The liquid cannot reverse through the upstream check valve 72a or flow through the control valve 78a, which is closed; so the vaporized liquid must return to the storage tank 18 through the downstream check valve 74a and the return path 64. This vapor returning to the storage tank causes the pressure in the storage tank to increase, thus facilitating flow of fuel to the engine. The flow paths are charged by demand from the engine. The control valves alternately open and close so that one path feeds the engine while the other path traps LNG, which vaporizes, expands, and flows back to the tank through check valves.

The pressure building process is driven by downstream demand from the engine, rather than gravity. Because the storage tank can be a small horizontal tank, there may not be enough liquid head to drive a gravity pressure building system. With engine demand feeding the heat exchanger, the heat exchanger can be mounted anywhere with respect to the fuel tank.

If pressure in the storage tank 18 is higher than desired, as sensed by the pressure sensor 84, it is not necessary for the system to build pressure. The pressure regulator 40 opens, allowing excess vapor to enter the internal withdrawal tube 30, then into the external vapor manifold, and then through the pressure regulator 40. The vapor then flows through the vapor tubing 44 and joins the liquid flow stream at liquid piping 52. The combined flow stream then flows through the manual shut off valve 70. In this case, the control valves 78a and 78b remain open, and the liquid and vapor from the storage tank 18 flow through both flow paths 60a and 60b of the heat exchanger 56 and on into the engine 14.

Figure 1B:
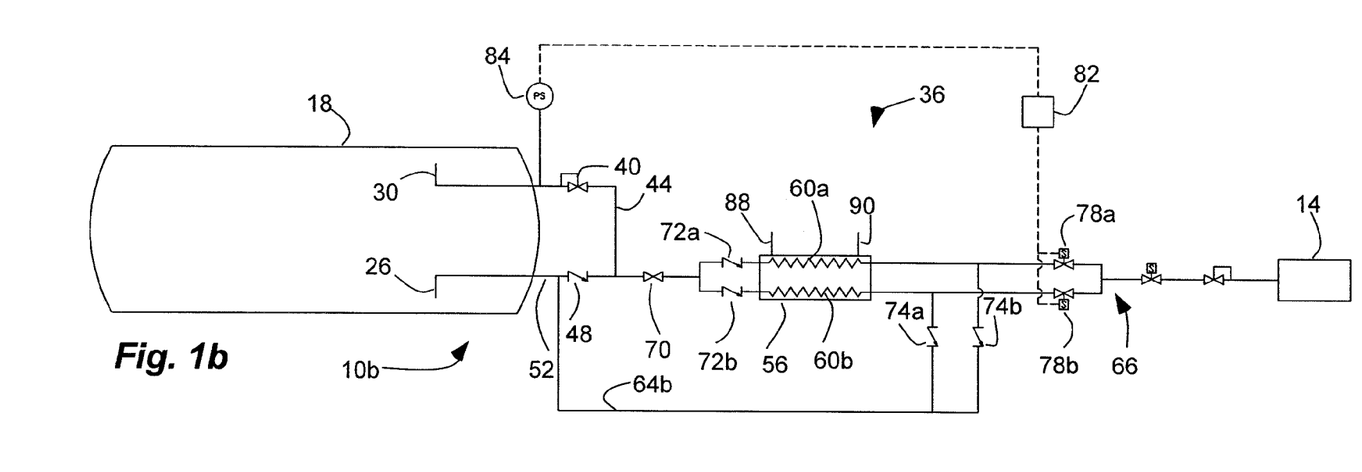
FIG. 1b is a schematic view of another LNG system for a natural gas vehicle engine in accordance with another embodiment of the present invention.

Referring to FIG. 1b, another system 10b is shown that is similar in most respects to that described above, but with the return path 64b routing the warm vapor back to the bottom of the storage tank 18, rather than the top. When the vapor is returned to the top it has the effect of raising tank pressure. Vehicle motion while being driven can cause the cold liquid to condense some of this warm vapor, causing tank pressure to be reduced and the liquid temperature to be raised. Eventually the liquid and vapor will reach equilibrium at the liquid's boiling point. By returning the vapor to the bottom of the tank the liquid is warmed directly, raising its pressure gradually, and maintaining the tank at a more stable pressure.

Figure 2:
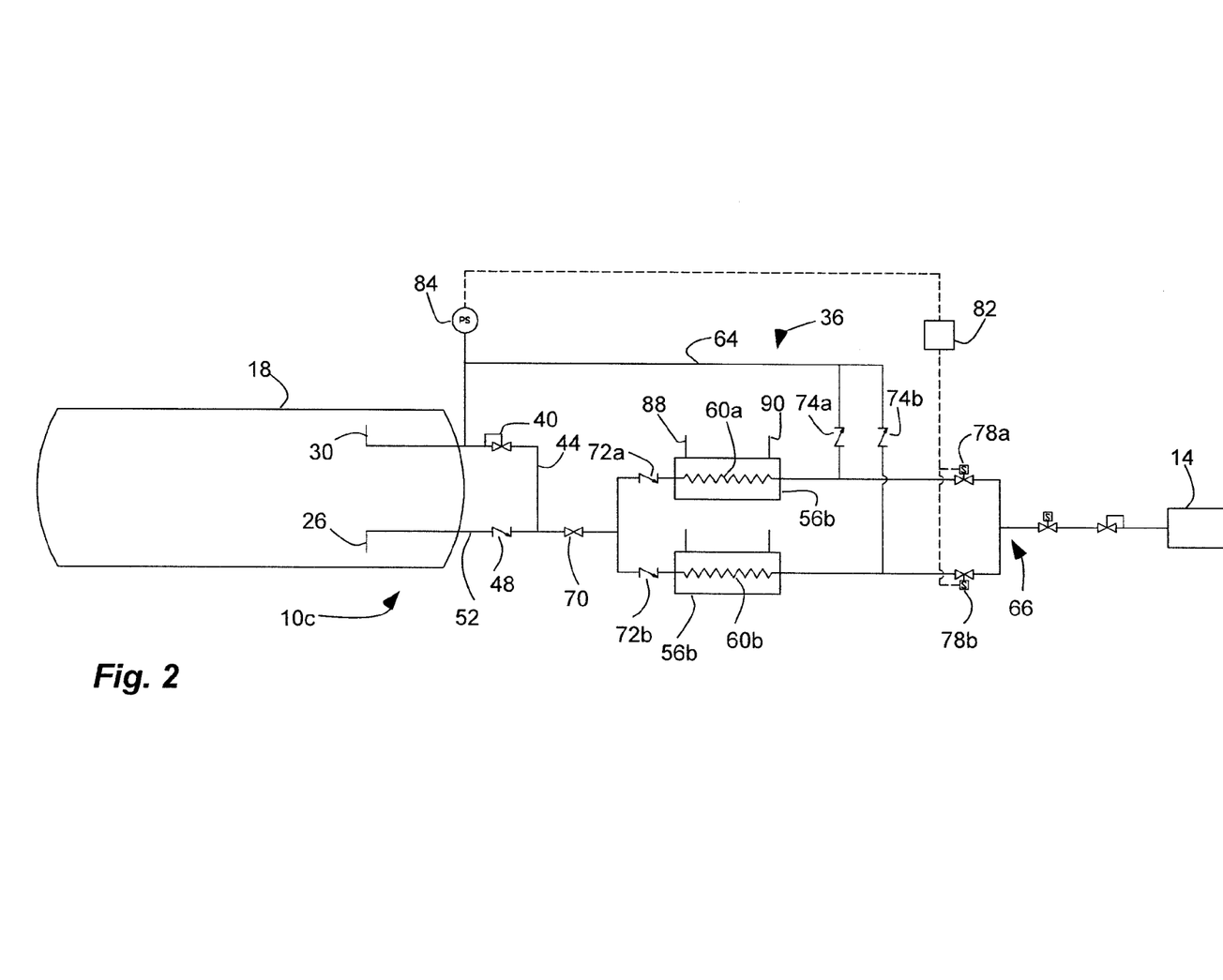
FIG. 2 is a schematic view of another LNG system for a natural gas vehicle engine in accordance with another embodiment of the present invention.

Referring to FIG. 2, another system 10c is shown that is similar in most respects to that described above, but with dual single-path heat exchangers. Thus the system has two heat exchangers 56a and 56b with a single path, 60a and 60b respectively, through each, instead of one heat exchanger with two flow paths. The main advantage of this variation is that it allows the use of multiple single path heat exchangers that are normally used on existing LNG vehicles.

Figure 3:
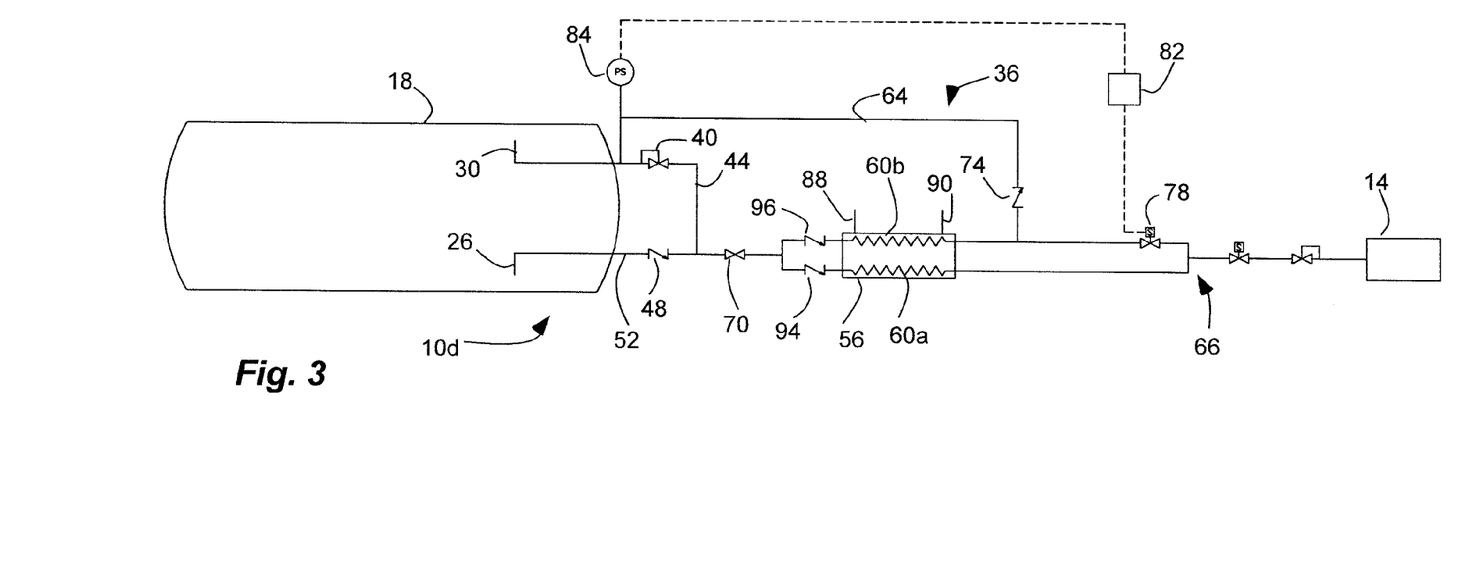
FIG. 3 is a schematic view of another LNG system for a natural gas vehicle engine in accordance with another embodiment of the present invention.

Referring to FIG. 3, another system 10d is shown that is similar in most respects to that described above, but with a single control valve 78 coupled to one of the parallel paths, such as the secondary path 60b. The single control valve 78 can cycle open and closed when tank pressure is low. When the control valve is open, flow from the tank to the engine occurs through both flow paths 60a and 60b. A check valve 94 with a stiffer spring creating a higher cracking pressure, or higher pressure check valve (e.g. 3 psi), in the primary flow path 60a, creates enough back pressure that the flow preferentially travels through the secondary flow path 60b with the open control valve 78. The secondary flow path 60b can have a check valve 96 with a looser spring creating a lower cracking pressure, or lower pressure check valve (e.g. ½ psi), in the secondary flow path. When the control valve 78 cycles closed, the trapped LNG vaporizes and flows to the tank as described above, and the engine is fed by the primary flow path 60a through the stiffer check valve 94. The main advantage of this design is that it only requires a single solenoid valve, which can save on installation and maintenance costs.

Figure 4:
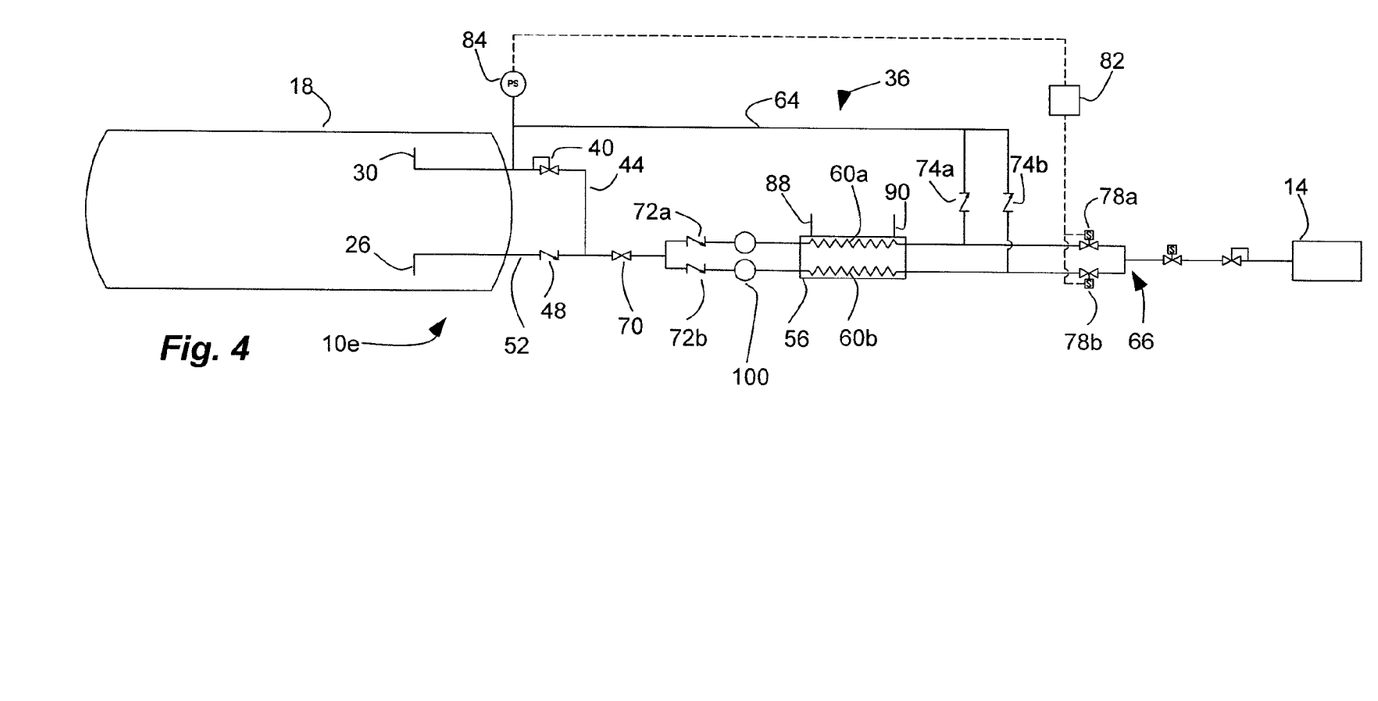
FIG. 4 is a schematic view of another LNG system for a natural gas vehicle engine in accordance with another embodiment of the present invention.

Referring to FIG. 4, another system 10e is shown that is similar in most respects to that described above, but with liquid reservoirs 100 in the upstream piping. The liquid reservoirs can include a small chamber installed in the piping upstream of the heat exchanger. A separate chamber is used in each flow path. The chamber can fill with LNG and therefore provide more mass of LNG that can be vaporized and returned to the storage tank. The LNG in the reservoir can enter the heat exchanger when the flow path is closed by ambient heat to vaporize LNG in the reservoir.

Figure 5:
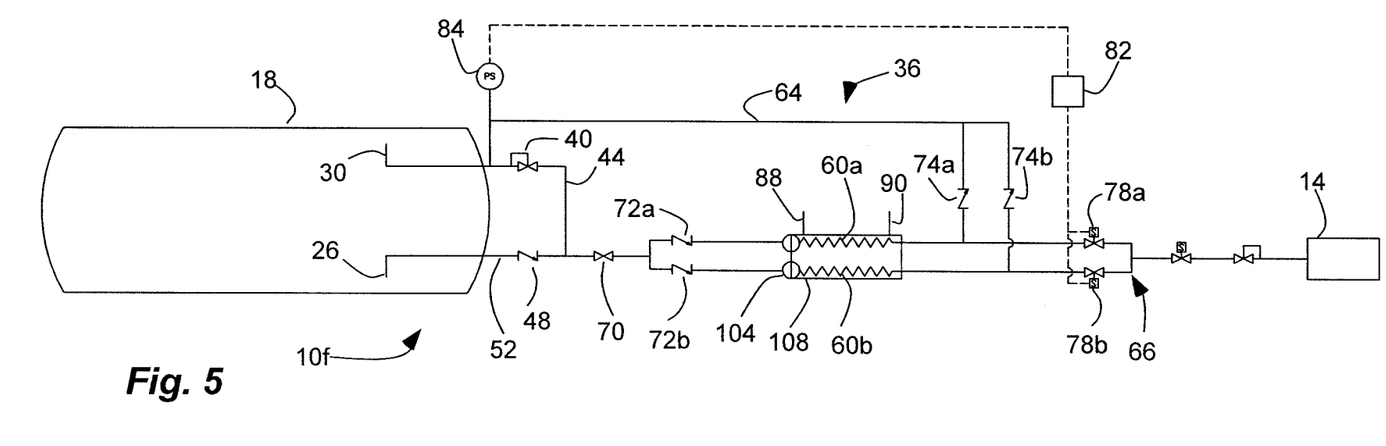
FIG. 5 is a schematic view of another LNG system for a natural gas vehicle engine in accordance with another embodiment of the present invention.

Referring to FIG. 5, another system 10f is shown that is similar in most respects to that described above, but with liquid reservoirs 104 integral with the heat exchanger 108. The reservoirs can be built into the end cap of the heat exchanger. The liquid in the reservoir can be heated by the heat exchanger fluid, increasing the rate of pressure rise in the flow path.

Figure 6:
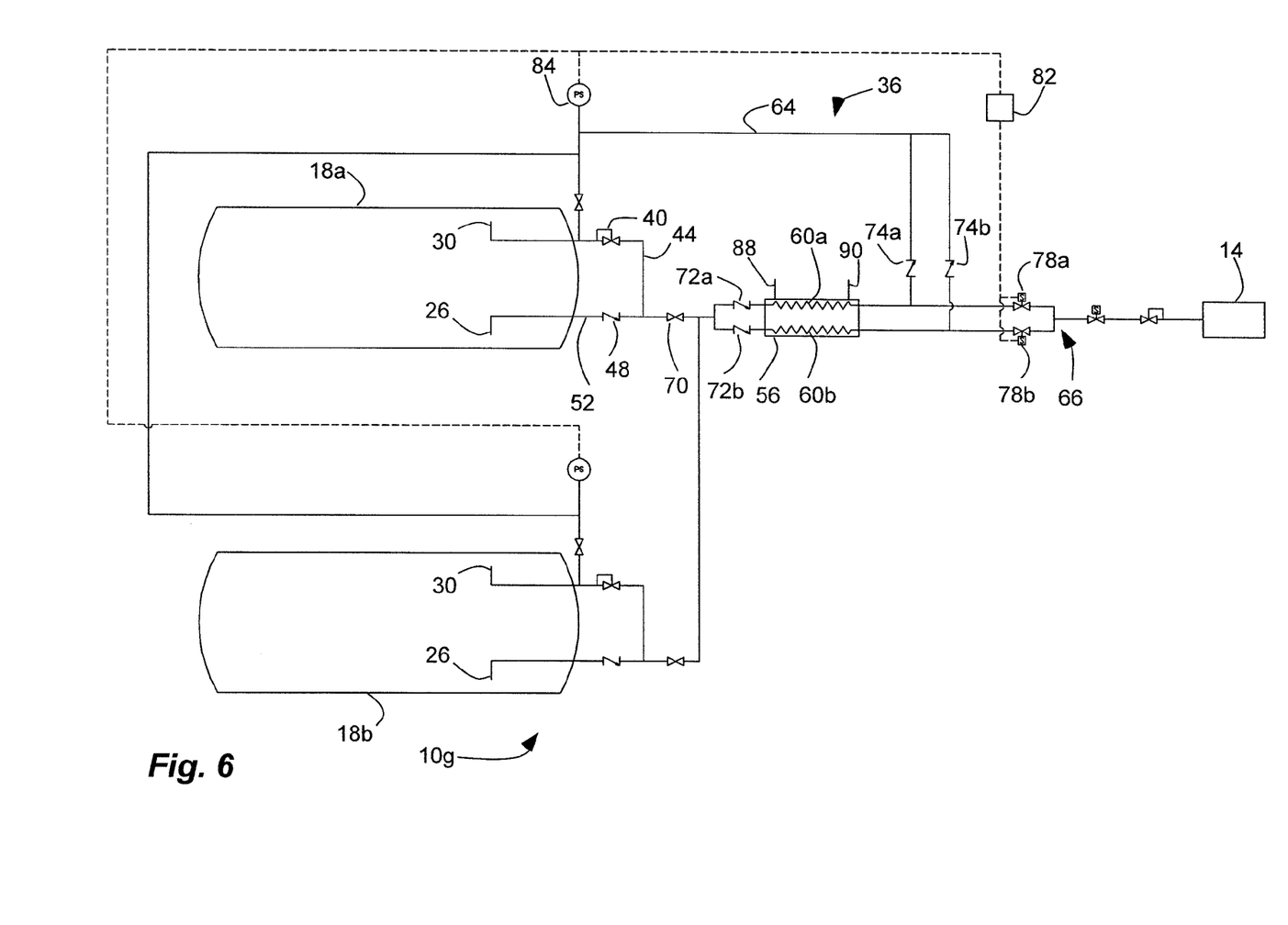
FIG. 6 is a schematic view of another LNG system for a natural gas vehicle engine in accordance with another embodiment of the present invention.

Referring to FIG. 6, another system 10g is shown that is similar in most respects to that described above, but with multiple storage tanks 18a and 18b. Many existing vehicles use two or three tanks in order to extend the vehicles' range. These tanks are piped together in parallel, using several different piping techniques. The multiple flow path heat exchanger works with multiple tanks by first connecting the liquid and vapor circuits on each tank using the pressure control devices, and manifolding these circuits together upstream of the heat exchanger. The vapor lines on each tank are connected together so that pressure in the tanks equalize, and to allow the vapor return from the heat exchanger to flow into both tanks.

Figure 7:
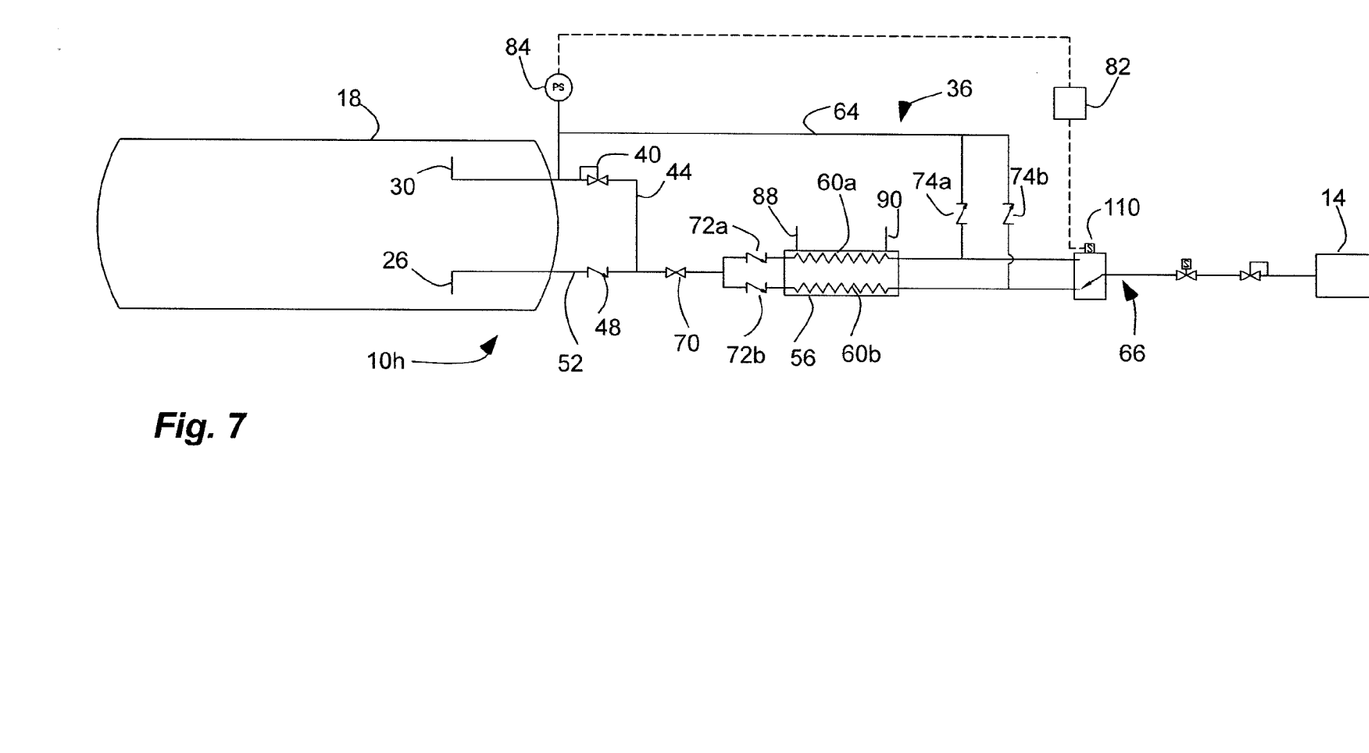
FIG. 7 is a schematic view of another LNG system for a natural gas vehicle engine in accordance with another embodiment of the present invention.

Referring to FIG. 7, another system 10h is shown that is similar in most respects to that described above, but with a single control valve 110 coupled to both parallel flow paths 60a and 60b, as opposed to separate control valve for each flow path. The single control valve 110 can be a 3-way diverter ball valve, a hydraulic-style block slide valve, etc.

Figure 8:
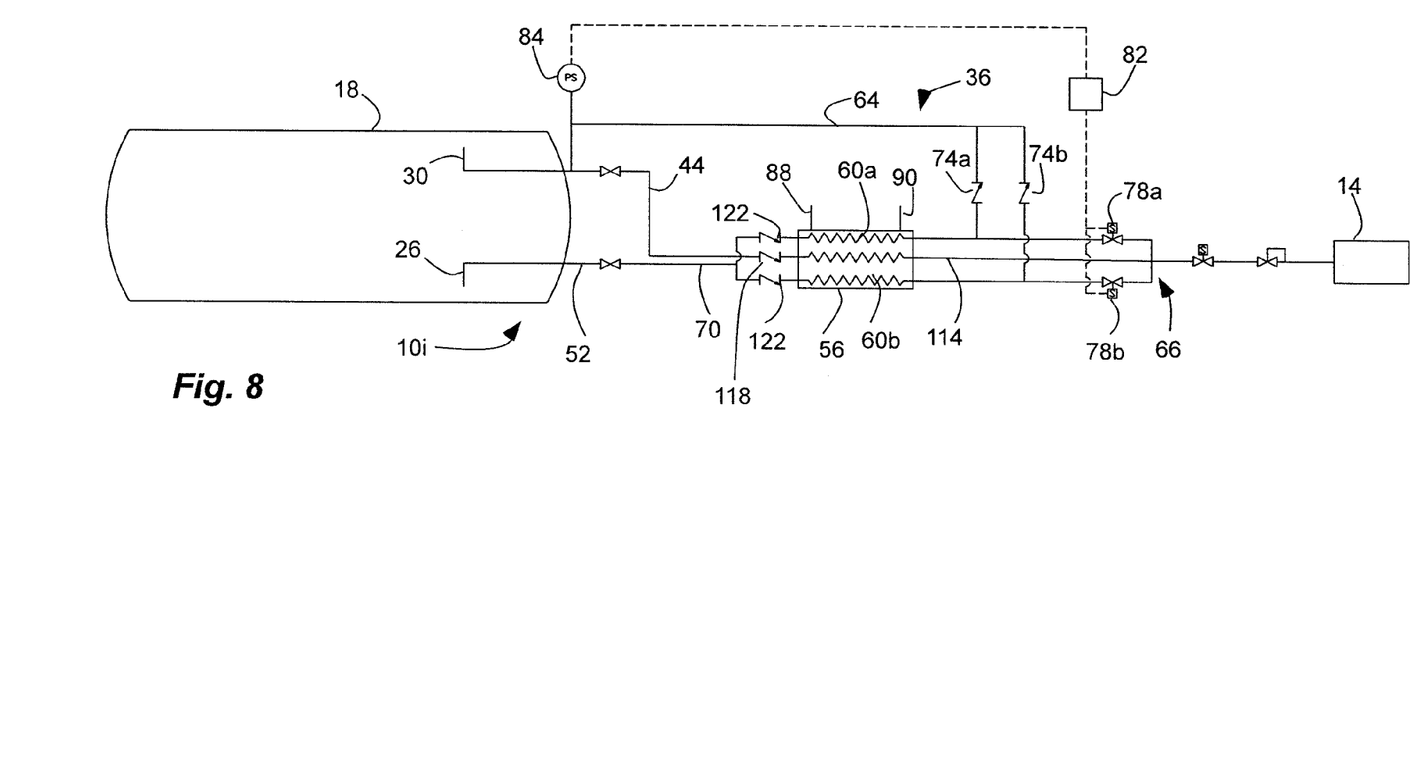
FIG. 8 is a schematic view of another LNG system for a natural gas vehicle engine in accordance with another embodiment of the present invention.

Referring to FIG. 8, another system 10i is shown that is similar in most respects to that described above, but with downstream pressure control. The system 10i can be optimized to work with the multiple flow path heat exchanger. For example, the flow control devices from the existing vehicle tank can be removed, and control valves 78a and 78b can be used to perform the same functions. On LNG vehicle tanks as commonly used, a pressure regulator on either the vapor or liquid side of the tank helps regulate tank pressure by preferentially consuming excess vapor when tank pressure is high and liquid only when tank pressure is normal or low. These mechanical devices are not very accurate. The control valves 78a and 78b downstream of the heat exchanger can be used to control tank pressure. If tank pressure is low, the control valves alternate as described above, building tank pressure. In addition, if tank pressure is low, a third or tertiary vapor flow path 114 with a higher cracking pressure check valve 118, or higher pressure check valve (e.g. 3 psi), does not flow. The other flow paths can have lower cracking pressure check valves 122, or lower pressure check valve (e.g. ⅛ psi). If tank pressure is normal, then the control valves 78a and 78b open, allowing liquid to vaporize and flow to the engine without building pressure in the storage tank. Excess vapor still does not flow through the third path 110 because of the higher cracking pressure check valve 118. If vehicle tank pressure is excessively high, then both control valves 78a and 78b are closed, causing only vapor to flow through the third path 110. This will bring tank pressure down to normal levels quickly, at which point one of the control valves opens, and liquid is fed to the engine through the heat exchanger.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A liquefied natural gas system for a natural gas vehicle engine, the system comprising:
   a) at least one insulated storage tank capable of receiving liquefied natural gas;
   b) at least one heat exchanger operatively coupled to the at least one storage tank;
   c) a piping system coupling the at least one insulated storage tank and the at least one heat exchanger, and including dual flow paths through the at least one heat exchanger, a return path from the dual flow paths downstream of the at least one heat exchanger to the storage tank, and an engine feed path from the dual flow paths configured to be coupled to the engine; and
   d) a valve and control system coupled to the dual flow paths capable of alternating flow through the dual flow paths so that one flow path supplies the engine through the engine feed path while the other flow path pressurizes the storage tank through the return path.

2. A system in accordance with claim 1, wherein the valve and control system includes at least one control valve coupled to at least one of the dual flow paths downstream of the at least one heat exchanger and subsequent to the return path to trap the liquefied natural gas in the at least one of the dual flow paths in the heat exchanger so that the liquefied natural gas becomes a warm vapor in the heat exchanger and flows through the return path to the storage tank.

3. A system in accordance with claim 1, wherein the dual flow paths include a primary and a secondary flow path through the at least one heat exchanger; and wherein the valve and control system has at least two configurations in response to a lower pressure in the storage tank, including:
   a) the primary flow path open to the engine feed path to supply the engine, while the secondary flow path is closed to the engine feed path and open to the return path to pressurize the storage tank; and
   b) the secondary flow path open to the engine feed path to supply the engine, while the primary flow path is closed to the engine feed path and open to the return path to pressurize the storage tank.

4. A system in accordance with claim 3, wherein the valve and control system has at least three configurations, further including:
   both the primary and secondary flow paths open to the engine feed path to supply the engine in response to a higher pressure in the storage tank.

5. A system in accordance with claim 1, further comprising:
   a pressure sensor coupled to the piping system or storage tank, and coupled to the valve and control system.

6. A system in accordance with claim 1, further comprising:
   a pair of upstream check valves coupled to the dual flow paths upstream of the at least one heat exchanger; and
   at least one downstream check valve coupled to at least one of the dual flow paths downstream of the at least one heat exchanger and coupled to the return path.

7. A system in accordance with claim 1, wherein:
   the dual flow paths include a pair of parallel paths through the at least one heat exchanger; and
   the valve and control system includes a pair of control valves each coupled to a different one of the pair of parallel paths downstream of the at least one heat exchanger.

8. A system in accordance with claim 1, wherein:
   the dual flow paths includes a pair of parallel paths through the at least one heat exchanger including a primary flow path and a secondary flow path; and
   the valve and control system includes a control valve coupled to the secondary flow path, and a pair of upstream check valves coupled to the pair of parallel paths upstream of the at least one heat exchanger including a lower pressure check valve coupled to the secondary flow path and a higher pressure check valve coupled to the primary flow path.

9. A system in accordance with claim 1, further comprising:
a tertiary flow path parallel with the dual flow paths through the at least one heat exchanger;
a pair of lower pressure upstream check valves coupled to the dual flow paths upstream of the at least one heat exchanger; and
a higher pressure upstream check valve coupled to the tertiary flow path upstream of the at least one heat exchanger.

10. A system in accordance with claim 1, further comprising:
a pair of secondary chambers coupled to the dual flow paths upstream of the at least one heat exchanger.

11. A liquefied natural gas system for a natural gas powered vehicle engine, the system comprising:
a) at least one insulated storage tank capable of receiving liquefied natural gas from a liquefied natural gas refueling station and capable of containing the liquefied natural gas as a cold vapor, a liquefied gas, or both;
b) at least one heat exchanger operatively coupled to the at least one storage tank and capable of receiving the cold vapor, the liquefied gas, or both from the storage tank and capable of producing a warm vapor output;
c) a piping system coupled to the at least one storage tank and the at least one heat exchanger and configured to be coupled to the engine;
d) a pair of parallel paths formed in the piping system through the at least one heat exchanger;
e) at least one return path formed in the piping system and extending from at least one of the pair of parallel paths downstream of the at least one heat exchanger to the storage tank;
f) at least one valve coupled to at least one of the pair of parallel paths; and
g) a control system coupled to the at least one valve to alternately allow flow through one of the pair of parallel paths to supply the engine, while flow through the other of the pair of parallel paths returns to the storage tank through the return path to pressurize the storage tank.

12. A system in accordance with claim 11, wherein the pair of parallel paths includes a primary and a secondary flow; and wherein the at least one valve and the control system have at least two configurations in response to a lower pressure in the storage tank, including:
a) the primary flow path open to an engine feed path to supply the engine, while the secondary flow path is closed to the engine feed path and open to the return path to pressurize the storage tank; and
b) the secondary flow path open to the engine feed path to supply the engine, while the primary flow path is closed to the engine feed path and open to the return path to pressurize the storage tank.

13. A system in accordance with claim 12, wherein the at least one valve and the control system have at least three configurations, further including:
both the primary and secondary flow paths open to the engine feed path to supply the engine in response to a higher pressure in the storage tank.

14. A system in accordance with claim 11, further comprising:
a pair of upstream check valves coupled to the pair of parallel paths upstream of the at least one heat exchanger; and
at least one downstream check valve coupled to at least one of the pair of parallel paths downstream of the at least one heat exchanger and coupled to the return path.

15. A system in accordance with claim 11, wherein the at least one valve and the control system include a pair of control valves each coupled to a different one of the pair of parallel paths downstream of the at least one heat exchanger.

16. A system in accordance with claim 11, wherein:
the pair of parallel paths through the at least one heat exchanger includes a primary flow path and a secondary flow path; and
the at least one valve and the control system include a control valve coupled to the secondary flow path, and a pair of upstream check valves coupled to the pair of parallel paths upstream of the at least one heat exchanger including a lower pressure check valve coupled to the secondary flow path and a higher pressure check valve coupled to the primary flow path.

17. A system in accordance with claim 11, further comprising:
a tertiary flow path parallel with the pair of parallel paths through the at least one heat exchanger; and
a pair of lower pressure upstream check valves coupled to the pair of parallel paths upstream of the at least one heat exchanger; and
a higher pressure upstream check valve coupled to the tertiary flow path upstream of the at least one heat exchanger.

18. A system in accordance with claim 11, further comprising:
a pair of secondary chambers coupled to the pair of parallel paths upstream of the at least one heat exchanger.

19. A liquefied natural gas system in combination with a vehicle with a natural gas powered engine, comprising:
a) at least one insulated storage tank carried by the vehicle and capable of receiving liquefied natural gas from a liquefied natural gas refueling station and containing the liquefied natural gas as a cold vapor, a liquefied gas, or both;
b) at least one heat exchanger carried by the vehicle and operatively coupled to the at least one storage tank and capable of receiving the cold vapor, the liquefied gas, or both from the storage tank and capable of producing a warm vapor output;
c) a piping system including dual flow paths through the at least one heat exchanger, a return path from the dual flow paths to the storage tank, and an engine feed path from the dual flow paths to the engine, flow of the liquefied natural gas through the piping system driven by demand from the engine;
d) the dual flow paths including a primary and a secondary flow path formed in parallel in the piping system through the at least one heat exchanger;
e) a pressure sensor coupled to the piping system, the storage tank or the engine;
f) at least one control valve coupled to at least one of the primary and secondary flow paths;
g) a control system coupled to the at least one control valve and the pressure sensor, capable of alternating flow through the dual flow paths while the flow is driven by demand from the engine, and having at least two configurations in response to a lower pressure, including:
i) the primary flow path open to the engine feed path to supply the engine, while the secondary flow path is closed to the engine feed path and open to the return path to pressurize the storage tank; and ii) the secondary flow path open to the engine feed path to supply the engine, while the primary flow path is closed to the engine feed path and open to the return path to pressurize the storage tank.

20. A system in accordance with claim 19, wherein the control system has at least three configurations, further including:

both the primary and secondary flow paths open to the engine feed path to supply the engine in response to a higher pressure in the storage tank.

* * * * *